Nov. 15, 1966

J. DUCUING ETAL 3,285,362

SOUND WAVE RADIATOR DEVICES

Filed June 29, 1960

United States Patent Office 3,285,362
Patented Nov. 15, 1966

3,285,362
SOUND WAVE RADIATOR DEVICES
Jacques Ducuing and Jean Claude Simon, Paris, France, assignors to Compagnie Generale de Telegraphie Sans Fil, a corporation of France
Filed June 29, 1960, Ser. No. 39,729
Claims priority, application France, July 20, 1959, 800,519/59
5 Claims. (Cl. 181—.5)

The present invention relates to sound wave radiator devices.

More particularly, it is an object of the invention to provide a sound wave radiator device, the thickness of the main body portion of which may be very small.

A radiator according to the invention comprises a rectangular shaped strip the thickness of which is small with respect to the operating wave-length and which is coupled, along two opposite edges to two identical parallel bars, means being provided for submitting said bars to torsional vibrations of the same amplitude and of opposite phases.

The bending vibration thus created in the strip propagates along the direction of the bars. The propagation velocity $V_1$ of the acoustical energy in such a structure depends on the propagation velocity $V_2$ of the torsional vibration in the bars and on the velocity $V_3$ of the bending vibration in the strip, considered alone, and on the coupling coefficient C between the strip and the bars, which, in turn, depends on the manner in which the strip and the bars are tied to each other.

By acting on $V_2$, $V_3$ and C, the velocity $V_1$ may be adjusted to the desired value.

The invention will be best understood from the following description and appended drawing, wherein.

Figure 1:
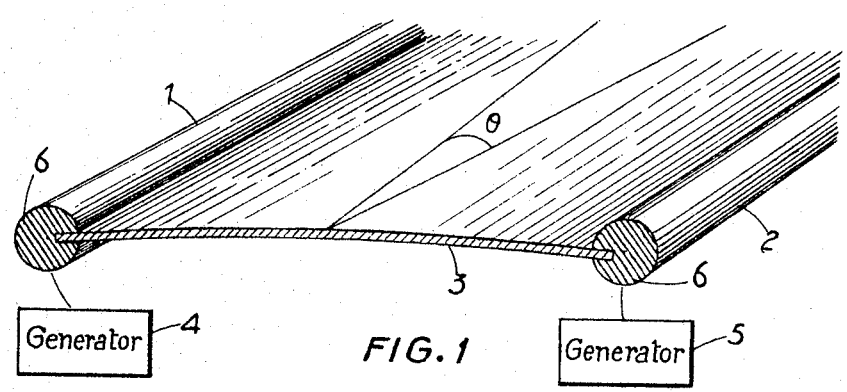
FIG. 1 is diagrammatic view in perspective of one embodiment of the invention.

The radiating device shown in FIG. 1, comprises two rods or bars 1 and 2. A thin strip 3 has two of its opposite edges respectively embedded in rods 1 and 2. The rods and the strip are, for example, made of mild steel. Rods 1 and 2 are caused to perform torsional vibrations by means of any suitable exciter systems of known type, diagrammatically shown at 4 and 5, the resulting vibrations having the same amplitude, but being of opposite phases. Under these conditions bars 1 and 2 give up a part of their energy to strip 3 which is subjected to bending vibrations.

Figure 2:
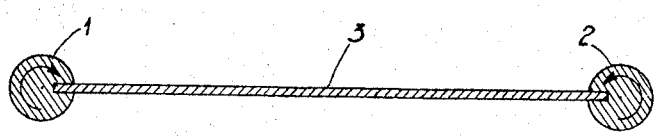
FIG. 2 is an end view of the device illustrated is FIG. 1.

Rods 1 and 2, which undergo torsional vibrations, do not radiate energy to any substantial amount. However, all the energy of strip 3 is radiated. Calling $W_2$ the vibration energy in any cross-section of strip 3 as shown in FIG. 2, and $W_1$ the energy of each rod, the coupling coefficient C between the rods and the strip is $$C = \frac{W_2}{2W_1}$$

If $V_2$ is the propagation velocity of the torsional wave in rods 1 and 2, and $V_3$ the velocity of the bending vibration in strip 3, it may be shown that the vibration volocity $V_1$ in the whole of the assembly shown in FIG. 1 is $V_1 = f(V_2, V_3, C)$.

It is known that the torsional vibration speed $V_2$ in rods or bars depends only on the shape of their cross-sections, and not on their size, and on the material of which they are made. The velocity of the torsional vibrations in a bar is given by formula:

$$V_C \sqrt{\frac{\omega}{2(1+\sigma)}}$$

where:

$V_C$ is the velocity of the compression wave in the same bar;

$\omega$ is a coefficient depending on the shape of the cross-section of the bar; ($\omega = 1$ for a circular cross-section and $\omega = 0.843$ for a square cross-section); and $\sigma$ is the Poisson coefficient of the material of which the bar is made.

This formula shows that $V_2$ may be selected within wide limits.

The velocity $V_3$ of the bending wave in a thin strip is generally very low. It is an increasing function of the thickness of the strip, which is small, and generally limited by space requirement considerations, and of the vibration frequency.

By suitably selecting $V_2$ and C, any value of velocity $V_1$ may be obtained, whatever the thickness of the strip. In particular, $V_1$ may be given a value of the order of the propagation velocity $V_4$ of the sound in the ambient medium. Assuming that the medium is water, $V_4$ will be of the order of 1,500 M/s.

Assuming that $V_1 > V_4$, the radiator will radiate in a plane forming an angle $\theta$ with the plane of the strip, $\theta$ being given by the formula:

$$\cos \theta = V_4/V_1$$

Since, for reason of symmetry, the radiation is contained in the plane of symmetry of the structure, the radiator will radiate along a straight line D, which is the intersection of the plane defined by angle $\theta$ and of the plane of symmetry.

If C is of the order 1/10, $V_1$ is substantially equal to $V_3$.

The invention has the advantage of making use of the excellent radiating properties of the strips subjected to bending vibrations, while making it possible to use thin strips, vibrating at very low frequencies. Strips energized in any other way, would not radiate for instance in water, on account of the low propagating velocity of the vibration, while bars subjected to torisonal vibration, radiate only very little. In order to eliminate any radiation therefrom they be may be coated with an acoustically insulating material 6, such as "Klegecel."

Figure 3:
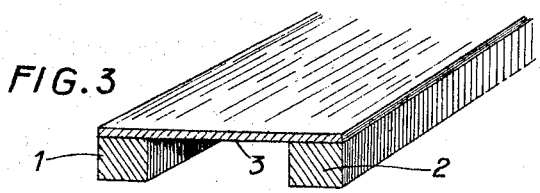
FIG. 3 is a perspective view of another embodiment of the invention.

FIG. 3 illustrates an embodiment wherein bars 1 and 2 are of a rectangular cross-section and strip 3 has one of its faces soldered to one of the faces of the bars.

Of course the invention is not limited to the embodiment shown which has been given solely by way of example.

What is claimed is:

1. A device for radiating a sound wave having a predetermined frequency comprising: a strip, the thickness of which is small compared to the wavelength in the ambient medium of the energy to be radiated, said strip having two edges extending in a predetermined direction; two bars, respectively coupled to said two edges; means for exciting in said two bars torsional vibrations at said frequency, in phase opposition with respect to each other.

2. A device for radiating a sound wave having a predetermined frequency comprising: a strip, the thickness of which is small compared to the wavelength in the ambient medium of the energy to be radiated, said strip having two edges extending in a predetermined direction; two bars, of circular cross-section, respectively coupled to said two edges; and means for exciting in said two bars torsional vibrations at said frequency, in phase opposition with respect to each other.

3. A device for radiating a sound wave having a predetermined frequency comprising: a strip, the thickness of which is small compared to the wavelength in the ambient medium of the energy to be radiated, said strip having two edges extending in a predetermined direction; two bars, of rectangular cross-section, respectively coupled to said edges; and means for exciting in said two bars torsional vibrations at said frequency, in phase opposition with respect to each other.

4. A device for radiating a sound wave having a predetermined frequency comprising: a strip, the thickness of which is small compared to the wavelength in the ambient medium of the energy to be radiated, said strip having two edges extending in a predetermined direction; two bars; said edges of said strips being respectively soldered to said bars; and means for exciting in said two bars torsional vibrations at said frequency, in phase opposition with respect to each other.

5. A device for radiating a sound wave having a predetermined frequency comprising: a strip, the thickness of which is small compared to the wavelength in the ambient medium of the energy to be radiated, said strip having two edges extending in a predetermined direction; two bars; said edges of said strips being respectively embedded into said bars; and means for exciting in said two bars torsional vibrations at said frequency in phase opposition with respect to each other.

References Cited by the Examiner

UNITED STATES PATENTS

| | | | |
|---|---|---|---|
| 2,227,268 | 12/1940 | Mason | 310—8.6 |
| 2,520,520 | 8/1950 | Woodward | 116—27 |

BENJAMIN A. BORCHELT, *Primary Examiner.*

ARTHUR M. HORTON, SAMUEL FEINBERG, *Examiners.*

R. F. STAHL, *Assistant Examiner.*